US008965962B2

(12) United States Patent
Mann et al.

(10) Patent No.: US 8,965,962 B2
(45) Date of Patent: Feb. 24, 2015

(54) DIAMETER SESSION AUDITS

(71) Applicant: Alcatel-Lucent, Paris (FR)

(72) Inventors: Robert A. Mann, Carp (CA); Lui Chu Yeung, Kanata (CA); Haiqing Ma, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/943,258

(22) Filed: Jul. 16, 2013

(65) Prior Publication Data
US 2013/0304893 A1 Nov. 14, 2013

Related U.S. Application Data

(63) Continuation of application No. 13/275,515, filed on Oct. 18, 2011, now Pat. No. 8,539,033, which is a continuation-in-part of application No. 12/825,654, filed on Jun. 29, 2010.

(51) Int. Cl.
*G06F 15/16* (2006.01)
*H04L 12/24* (2006.01)
(Continued)

(52) U.S. Cl.
CPC ............. *H04L 41/50* (2013.01); *H04L 43/10* (2013.01); *H04L 41/0816* (2013.01); *H04L 65/1066* (2013.01); *H04W 28/24* (2013.01); *H04L 41/0213* (2013.01)
USPC ........... 709/203; 709/223; 709/224; 709/226; 709/227; 709/228; 370/254; 370/390; 370/331; 713/150; 713/153; 713/168

(58) Field of Classification Search
CPC ................... G06F 2221/2101; G06F 11/3672; G06F 17/30368

USPC .................. 709/225, 227; 370/221, 242, 241
See application file for complete search history.

(56) References Cited

U.S. PATENT DOCUMENTS

2007/0203990 A1* 8/2007 Townsley et al. ............. 709/206
2009/0067439 A1* 3/2009 Yamamoto et al. ........... 370/400
(Continued)

FOREIGN PATENT DOCUMENTS

EP 0469495 A2 2/1992

OTHER PUBLICATIONS

3GPP TS 29.213 V8. 12.0 (Sep. 2011) "3rd Generation Partnership Project; Technical Specification Group Core Network and Terminals; Policy and Charging Control signalling flows and Quality of Service (QoS) parameter mapping (Release 8)" Sep. 2011 (Retrieved from the Internet:http://www.3gpp.org/ftp/specs/archive/29_series/29.213/29213-8c0.zip) • section 4.2 •.
(Continued)

*Primary Examiner* — Jude Jean Gilles
(74) *Attorney, Agent, or Firm* — Kramer Amado P.C.

(57) ABSTRACT

Various exemplary embodiments relate to a method and related network node including one or more of the following: determining by the network device that an S9 session should be audited; determining that the S9 session is a suspect session; transmitting an S9 message to a partner device, wherein the S9 message includes an innocuous instruction; receiving, at the network device, a response message from the partner device; determining, based on the response message, whether the suspect session is orphaned; and if the suspect session is orphaned, removing an S9 session record associated with the suspect session.

22 Claims, 8 Drawing Sheets

(51) Int. Cl.
  *H04L 12/26*   (2006.01)
  *H04L 29/06*   (2006.01)
  *H04W 28/24*   (2009.01)

(56) References Cited

U.S. PATENT DOCUMENTS

| | | | |
|---|---|---|---|
| 2009/0132712 A1* | 5/2009 | P et al. | 709/227 |
| 2009/0187498 A1* | 7/2009 | Kim et al. | 705/30 |
| 2011/0173334 A1* | 7/2011 | Shah | 709/228 |
| 2012/0106508 A1* | 5/2012 | Zhou et al. | 370/331 |
| 2012/0224469 A1* | 9/2012 | Erke et al. | 370/221 |

OTHER PUBLICATIONS

Network Working Group Request for Comments: 3588 (RFC3588)"Diameter Base Protocol" Sep. 2003, (Retrieved from the Internet:http://www.ietf.org/rfc/rfc3588.txt.pdf) • section 8.4 •.

International Search Report for PCT/CA2012/050728 dated Jan. 24, 2013.

3GPP TS 29.212,v9.3.0(2009), "3rd Generation Partnership Project; Technical Specification Group Core Network and Terminals; Policy and Charging Control Over Gx Reference Point (Release 9)", pp. 1-114.

3GPP TS 29.213,v8.6.0(2009), "3rd Generation Partnership Project; Technical Specification Group Core Network and Terminals; Policy and Charging Control Signalling Flows and QoS Parameter Mapping (Release 8)", pp. 1-122.

3GPP TS 29214,v9.2.0(2009), "3rd Generation Partnership Project; Technical Specification Group Core Network and Terminals; Policy and Charging Control Over Rx Reference Point (Release 9)", pp. 1-44.

3GPP TS 29.215,v10.2.0(2011), "3rd Generation Partnership Project; Technical Specification Group Core Network and Terminals; Policy and Charging Control Over (PCC) Over S9 Reference Point; Stage 3 (Release 10)", pp. 1-42.

* cited by examiner

| | Session ID | Subscription ID | PCRN Blade ID | Bound Session IDs |
|---|---|---|---|---|
| 425 | 0x284B | 10000000000000001 | 123.45.67.89 | {0x72A3; 0x32C3} |
| 430 | 0x72A3 | 10000000000000001 | 123.45.67.89 | {0x284B} |
| 435 | ... | ... | ... | ... |

| | Session ID | Subscription ID | Session Type | PCC Rules | QoS Rules | Event Triggers | Specific Action | Activity Timestamp |
|---|---|---|---|---|---|---|---|---|
| 545 | 0x284B | 10000000000000001 | IP-CAN | {0xA903} | {0x12B1} | {2,6,17} | - | 10:32 |
| 550 | 0x72A3 | 10000000000000001 | GW control | - | {0x12B1} | {14} | - | 10:36 |
| 555 | 0x32C3 | 10000000000000001 | AF | {0xA903} | - | - | {8} | 10:40 |
| 560 | ... | ... | ... | ... | ... | ... | ... | ... |

DIAMETER SESSION AUDITS

RELATED APPLICATIONS

This application is a continuation of application Ser. No. 13/275,515, filed on Oct. 18, 2011, which is a continuation-in-part of application Ser. No. 12/825,654, filed on Jun. 29, 2010, there entire disclosures of which are incorporated herein by reference for all purposes.

This application cross-references the following co-pending applications, incorporated by reference herein for all purposes: application Ser. No. 13/275,490, "INTEGRATION OF ROAMING AND NON-ROAMING MESSAGE PROCESSING" to Ma et al.; and application Ser. No. 13/275,647, "PCRN SESSION ARCHITECTURE FOR ROAMING" to Mann et al.

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

The 3GPP has also recommended various procedures for providing roaming access to various users. 3GPP TS 29.215 provides that a visited PCRF may communicate, via an S9 session, with an attached user's home PCRF. Over this S9 session, the visited PCRF may retrieve information useful in providing data flows requested by a user.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network device for auditing S9 sessions, the method including one or more of the following: determining by the network device that an S9 session should be audited; determining that the S9 session is a suspect session; transmitting an S9 message to a partner device, wherein the S9 message includes an innocuous instruction; receiving, at the network device, a response message from the partner device; determining, based on the response message, whether the suspect session is orphaned; and if the suspect session is orphaned, removing an S9 session record associated with the suspect session.

Various exemplary embodiments relate to a network device for auditing S9 sessions, the network device including one or more of the following: an S9 interface in communication with a partner device; an S9 session storage that stores an S9 session record associated with an S9 session; a scheduler configured to determine that the S9 session should be audited; a suspect session identifier configured to determine that the S9 session is a suspect session; an innocuous message generator configured to transmit an S9 message to the partner device, wherein the S9 message includes an innocuous instruction; and a response interpreter configured to: determine, based on the response message, whether the suspect session is orphaned; and if the suspect session is orphaned, remove the S9 session record from the S9 session storage.

Various exemplary embodiments relate to a tangible and non-transitory machine-readable storage medium encoded with instructions for execution by a network device for auditing S9 sessions, the tangible and non-transitory machine-readable storage medium including one or more of the following: instructions for determining by the network device that an S9 session should be audited; instructions for determining that the S9 session is a suspect session; instructions for transmitting an S9 message to a partner device, wherein the S9 message includes an innocuous instruction; instructions for receiving, at the network device, a response message from the partner device; instructions for determining, based on the response message, whether the suspect session is orphaned; and instructions for, if the suspect session is orphaned, removing an S9 session record associated with the suspect session.

Various embodiments are described wherein the step of determining that the S9 session is a suspect session including one or more of the following determining that an S9 session record associated with the S9 session does not identify any S9 subsessions.

Various embodiments additionally include one or more of the following: determining by the network device that an S9 subsession should be audited; determining that the S9 subsession is a suspect subsession; transmitting a second S9 message to the partner device, wherein the S9 message includes a second innocuous instruction; receiving, at the network device, a second response message from the partner device; determining, based on the second response message, that the suspect subsession is orphaned; and modifying the S9 session record to remove an identification of the suspect subsession, wherein the step of modifying the S9 session record is performed before the step of determining that an S9 session record associated with the S9 session does not identify any S9 subsessions.

Various embodiments are described wherein the step of determining that the S9 subsession is a suspect subsession including one or more of the following determining that a virtual IP-CAN session associated with the S9 subsession has not been active recently.

Various embodiments are described wherein the second innocuous instruction includes an instruction to provision an event trigger that has been previously provisioned for the S9 subsession.

Various embodiments are described wherein the innocuous instruction includes an instruction to terminate a fake S9 subsession.

Various embodiments are described wherein the step of determining, based on the response message, whether the suspect session is orphaned including one or more of the following: if the response message indicates that a session identifier is unknown to the partner device, determining that the suspect session is orphaned.

BRIEF DESCRIPTION OF THE DRAWINGS

In order to better understand various exemplary embodiments, reference is made to the accompanying drawings, wherein:

FIG. 4 illustrates an exemplary data arrangement for storing proxy data;

FIG. 5 illustrates an exemplary data arrangement for storing session data;

To facilitate understanding, identical reference numerals have been used to designate elements having substantially the same or similar structure and/or substantially the same or similar function.

DETAILED DESCRIPTION

Figure 1:
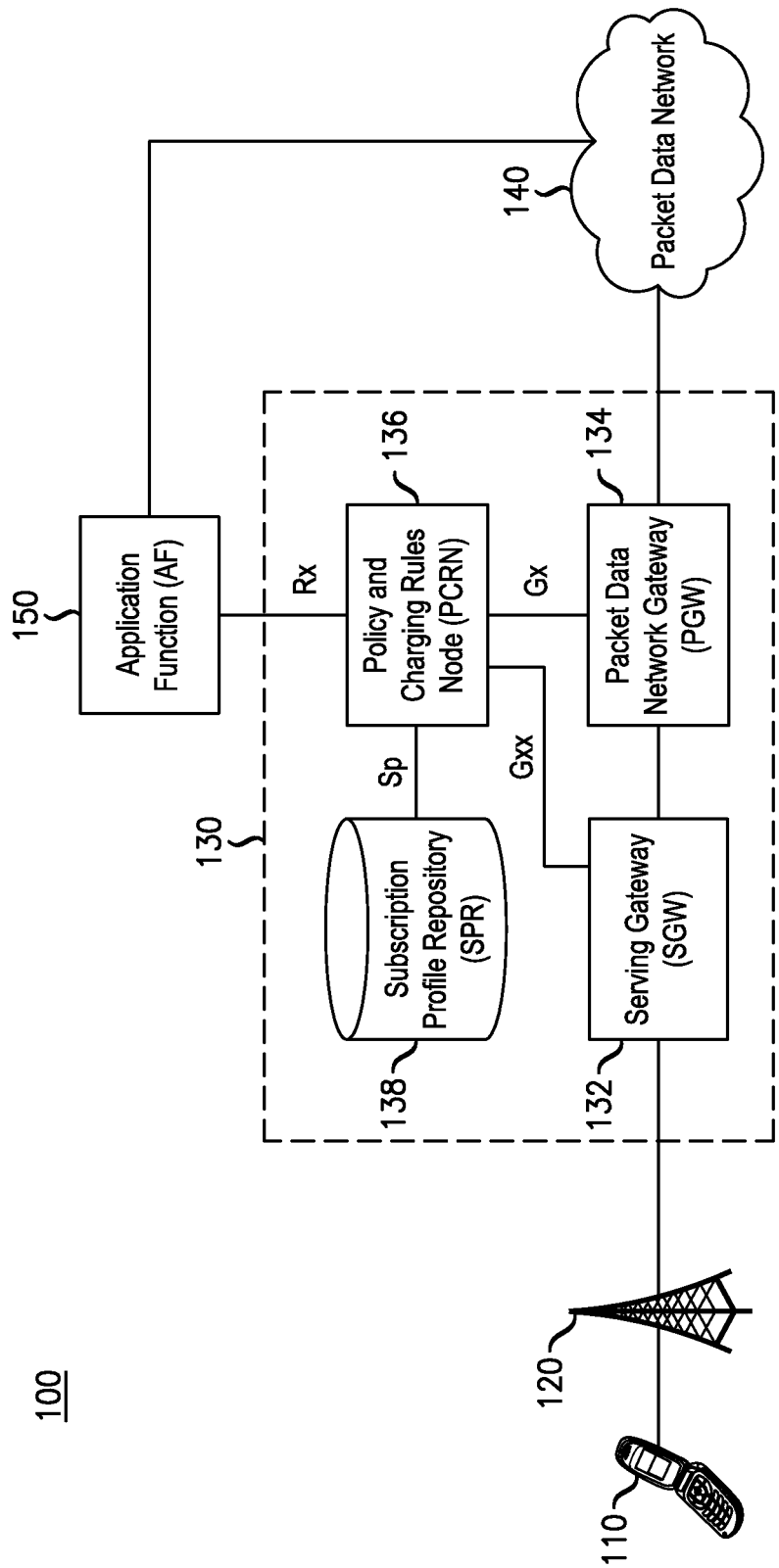
FIG. 1 illustrates an exemplary subscriber network for providing various data services.

Communications networks are not always guaranteed to be reliable. The 3GPP standards provide little guidance about how to handle communication failures within the EPC. For example, a session termination request may be sent to a policy and charging rules node but never received. In this scenario, the session and any other sessions bound thereto may not be terminated at every network component, creating an orphaned session. A session may also be inactive at the network component that initiated the session, but active at other network components. These orphaned and inactive sessions continue to consume system resources such as, for example, guaranteed bandwidth, system memory and processing time.

In view of the foregoing, it would be desirable to provide a policy and charging rules node (PCRN) capable of removing orphaned or inactive sessions. In particular, it would be desirable to detect and terminate orphaned and inactive S9 sessions without interfering with the operation of other network components.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-9.

PCRN 136 may perform session audits to determine whether any established session has become inactive, orphaned, or stale. PCRN 136 may perform session audits at regular intervals to detect sessions that are suspect of being inactive. PCRN 136 may determine that a session is suspect of being inactive if the elapsed time since the most recent activity timestamp exceeds a suspect inactivity time. When PCRN 136 determines that a session is suspect of being inactive, it may send an innocuous message to the network component that initiated the session. An innocuous message may be a request message that will not change the state of the session at the network component. For an IP-CAN session or a GW control session, an innocuous message may be an RAR command provisioning event triggers. For an AF session, an innocuous message may be an RAR command including a specific action.

Network components may respond to an innocuous message with an RAA command indicating a result code of a DIAMETER_SUCCESS (2001), DIAMETER_UNKNOWN_SESSION_ID (5002), or some other error code. The diameter success code or error code other than "unknown session" may indicate that the session is active at the network component. In this case, PCRN 136 may update the session activity timestamp without taking further action. The diameter unknown session ID code may indicate that the session is inactive, or has been terminated or orphaned, by the network component. In this case, PCRN 136 may take a management action for the session such as, for example, terminating the session, logging the session, and/or sending a simple network management protocol (SNMP) trap to inform a network management entity (NME) about the session.

Figure 2:
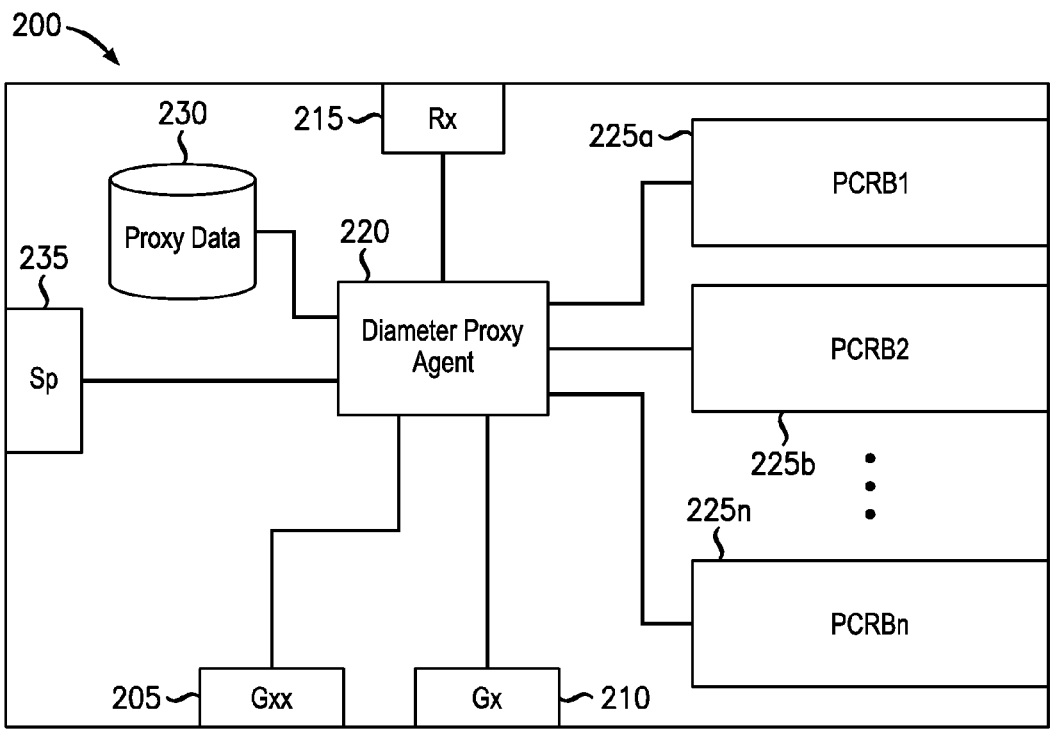
FIG. 2 illustrates an exemplary PCRN for managing sessions.

FIG. 2 illustrates an exemplary PCRN 200 for managing sessions. PCRN 200 may correspond to PCRN 136 of exemplary subscriber network 100. PCRN 200 may include Gx interface 205, Gxx interface 210, Rx interface 215, diameter proxy agent (DPA) 220, PCRN blades (PCRBs) 225a, 225b, . . . 225n, and proxy data storage 230.

Gxx interface 205 may be an interface comprising hardware and/or executable instructions encoded on a machine-readable storage medium configured to communicate with a serving gateway such as SGW 132. Such communication may be implemented according to the 3GPP TS 29.212 and 29.213. For example, Gxx interface 205 may receive GW control session establishment requests from SGW 132 and send QoS rules to SGW 132.

Gx interface 210 may be an interface comprising hardware and/or executable instructions encoded on a machine-readable storage medium configured to communicate with a packet data network gateway, such as PGW 134. Such communication may be implemented according to the 3GPP TS 29.212 and 29.213. For example, Gx interface 210 may receive IP-CAN session establishment requests and event messages from PGW 134 and send PCC rules to PGW 134.

Rx interface 215 may be an interface comprising hardware and/or executable instructions encoded on a machine-readable storage medium configured to communicate with a packet data network gateway, such as PGW 134. Such communication may be implemented according to the 3GPP TS 29.213 and 29.214. For example, Rx interface 215 may receive AF session requests from AN 150.

Diameter proxy agent (DPA) 220 may include hardware and/or executable instructions encoded on a machine-readable storage medium configured to manage sessions at the PCRN 200. DPA 220 may be responsible for binding related sessions together. DPA 220 may receive messages via Gxx interface 205, Gx interface 210 and/or Rx interface 215. If a session already exists for the message, DPA 220 may determine which PCRN blade 225 is responsible for the session. DPA 220 may then forward the message to the appropriate PCRN blade 225 for processing. If the message is a session establishment request, DPA 220 may decide which PCRN blade 225 to assign to managing the session. DPA 220 may decide to bind the new session to one or more existing session and forward the message to the PCRN blade 225 responsible for the bound session. DPA 220 may use proxy data storage 230 to store information for use in selecting PCRN blades. During a session audit DPA 220 may use information in the audit messages to update proxy data storage 230 to include correct session and binding information.

PCRN blades 225a, 225b, . . . 225n may include hardware and/or executable instructions encoded on a machine-readable storage medium configured to manage communications sessions at the PCRN 200. Each PCRN blade 225 may implement a Policy and Charging Rules Function (PCRF). In various alternative embodiments that do not use a DPA, a single PCRN blade 225 may function as PCRN 200. As will be described in further detail with regard to FIGS. 3-9, each PCRN blade 225 may conduct session audits to determine if any of the sessions it is managing have become orphaned or inactive.

Proxy data storage 230 may be any machine-readable medium capable of storing proxy data. Proxy data may be used by DPA 220 to determine to which PCRN blade 225 a session is assigned. Proxy data may also be used to determine whether sessions should be bound together. As will be described in further detail with regard to FIG. 4, proxy data may include a session ID, subscription ID, PCRN blade ID, a list of bound session IDs, and other information useful for managing sessions.

Sp interface 235 may be an interface including hardware and/or executable instructions encoded on a machine-readable storage medium configured to communicate with an SPR such as SPR 138. Sp interface 235 may transmit record requests and receive subscription profile records. DPA 220 may request subscription profile records from Sp interface 235 for use in determining which sessions should be bound together. As will be explained in further detail below with respect to FIGS. 8-12, PCRN blade 300 may also include an S9 interface (not shown) for communicating with other PCRNs (not shown) and/or PCRN blades (not shown).

Figure 3:
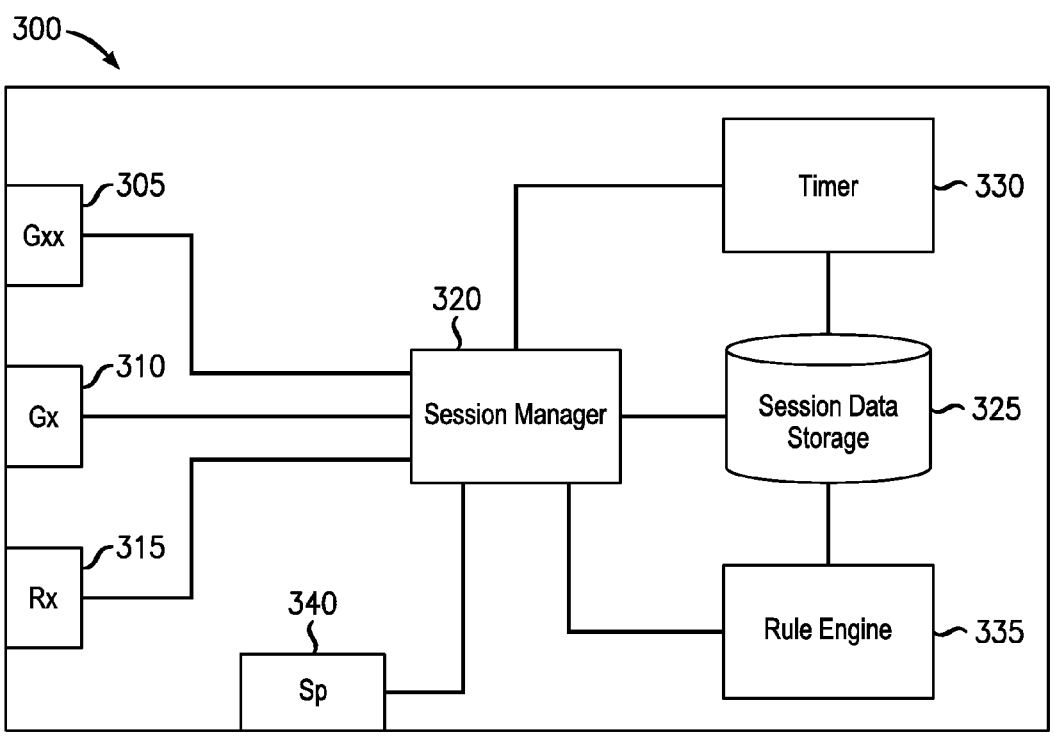
FIG. 3 illustrates an exemplary PCRN blade for conducting session audits.

FIG. 3 illustrates an exemplary PCRN blade 300 for managing communications sessions. PCRN blade 300 may correspond to PCRN blades 225. In various alternative embodiments, PCRN blade 300 may correspond to PCRN 136. PCRN blade 300 may include Gxx interface 305, Gx interface 310, Rx interface 315, session manager 320, session data storage 325, timer 330, and Sp interface 335.

Gxx interface 305 may be similar to Gxx interface 205. Gx interface 310 may be similar to Gx interface 210. Rx interface 315 may be similar to Rx interface 215. Sp interface 335 may be similar to Sp interface 235. Gxx interface 305, Gx interface 310, Rx interface 315, and Sp interface 340 may communicate indirectly with their respective network components through DPA 220. In various alternative embodiments, Gxx interface 305, Gx interface 310, Rx interface 315, and Sp interface 340 may communicate directly with their respective network components.

Session manager 320 may include hardware and/or executable instructions encoded on a machine-readable storage medium configured to establish and manage communications sessions. Session manager 320 may receive IP-CAN session establishment requests from SGW 132 through PGW 134 and Gx interface 310. GW control session requests from SGW 132 may arrive at session manager 320 via Gxx interface 305. Session manager 320 may receive AF session requests from ANs such as AN 150. When establishing sessions, session manager 320 may store session data regarding active sessions in session data storage 325. Session manager 320 may also monitor active sessions and terminate sessions based on internal or external triggers. Session manager 320 may manage sessions by updating information in session data storage 325 and communicating changes in the session to the appropriate network elements via Gxx interface 305, Gx interface 310, and Rx interface 315.

When timer 330 determines that a session is suspect of being inactive or orphaned, session manager 320 may conduct session audits. Session manager 320 may generate innocuous messages based on session data stored in session data storage 325. Session manager 320 may take session management actions based on the response to the innocuous message. For example, session manager 320 may terminate the session if the response indicates that the session is inactive. If session manager 320 does not receive a response, session manager 320 may take a session management action based on a default assumption such as, for example, lack of response indicates that the session is inactive. In various alternative embodiments, such a default assumption may instead indicate that if session manager 320 does not receive a response, session manager may refrain from taking any session management action.

Session data storage 325 may be any machine-readable medium capable of storing session data. As will be described in further detail with regard to FIG. 5, session data may include, for example, a session ID, subscription ID, session type, PCC rules, QoS rules, activity timestamp, event triggers and/or specific actions for each session.

Timer 330 may include hardware and/or executable instructions encoded on a machine-readable storage medium configured to determine when a session is suspect of being inactive. Timer 330 may monitor the current time. Timer 330 may be configured with an audit interval and a suspect inactivity time. The audit interval may be configured by an operator or calculated based on factors such as, for example, forwarding class, bearer type, total bandwidth allocated, and/or application type. Generally, as more resources are used by a session, a shorter audit interval becomes more desirable. Each time the audit interval passes, timer 330 may compare the activity timestamp for each session with the current time. If the difference between the activity timestamp and the current time exceeds the suspect inactivity time, timer 330 may request session manager 320 to perform a session audit.

Rule engine 335 may include hardware and/or executable instructions encoded on a machine-readable storage medium configured to generate and/or modify PCC and/or QoS rules. Rule engine 335 may generate PCC/QoS rules when session manager 320 first establishes a communications session. Rule engine 335 may generate new rules or delete existing rules when session manager 320 takes session management actions. For example, rule engine 335 may delete existing PCC rules for an IP-CAN session to eliminate an AF session that has been terminated. Rule engine 335 may update session data storage 325 whenever it generates or deletes a PCC/QoS rule.

FIG. 4 illustrates an exemplary data arrangement 400 for storing proxy data. Data arrangement 400 may be, for example, a table in a database stored in proxy data storage 230. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include data fields such as, for example, session ID field 405, subscription ID field 410, PCRN Blade ID 415, and bound session IDs field 420. Data arrangement 400 may include additional fields (not shown) required or useful in defining sessions and binding status. Data arrangement 400 may include multiple entries for sessions such as, for example, entries 425, 430 and 435.

Session ID field 405 may include a name assigned to an individual IP-CAN session. Values stored by session ID field 405 may be assigned by DPA 220 during session establishment. Session ID field 405 may be used as the Session-ID AVP in Diameter messages regarding a particular communication session. Subscription ID field 310 may include one or more names, numbers, and/or strings used to identify a subscription or subscriber record associated with communication session. Subscription ID 410 field may include, for example, International Mobile Subscriber Identification numbers (IMSI), Mobile Station International Subscriber Directory Numbers (MSISDN), Session Initiation Protocol Uniform Resource Indicators (SIP URI), and/or Network Access Identifiers (NAI). Subscription ID 410 may be used to locate a record corresponding to a request for subscriber records from SPR 138. PCRN Blade ID field 415 may indicate the PCRN blade 225 to which the session is assigned using, for example, an IP address, MAC address or other method that allows DPA 220 to address traffic to a PCRN blade. Bound session IDs field 420 may indicate any other sessions to which the session has been bound.

As an example of an entry in data arrangement 400, entry 425 may indicate a session "0x284B" for a subscriber "100000000000001." The session has been assigned to PCRN blade 123.45.67.89. The session is bound to sessions "0x72A3" and "0x32C3." As a second example of an entry in data arrangement 400, entry 430 may indicate a session "0x72A3" for a subscriber "100000000000001." The session has also been assigned to PCRN blade 123.45.67.89. The session is bound to session "0x284B." Entry 435 may indicate that data arrangement 400 may include additional entries for additional sessions.

FIG. 5 illustrates an exemplary data arrangement 500 for storing session data. Data arrangement 500 may be, for example, a table in a database stored in session data storage 325. Alternatively, data arrangement 500 could be a series of linked lists, an array, or a similar data structure. Thus, it should be apparent that data arrangement 500 is an abstraction of the underlying data; any data structure suitable for storage of this data may be used.

Data arrangement 500 may include data fields such as, for example, session ID field 505, subscription ID field 510, session type field 515, PCC rules field 520, QoS rules field 525, event triggers field 530, specific action field 535, and activity timestamp 540. Data arrangement 500 may include additional fields (not shown) required or useful in defining communications sessions. Data arrangement 500 may include multiple entries for sessions such as, for example, sessions 545, 550, 555, and 560.

Session ID field 505 may correspond to session ID field 405. Session ID field 505 may be used identify the session when managing records and communicating with network components. Subscription ID field 510 may be similar to subscription ID field 410. Subscription ID field 510 may be used to identify a subscriber associated with the session. Session type field 515 may include an indication of the type of communication session. Session types may include IP-CAN, GW control, AF, and any other type of session managed by PCRN 136. PCC rules field 520 may include a list of PCC rule names that are active for the session. QoS rules field 525 may include a list of QoS rule names that are active for the session. Event triggers field 530 may include a list of event triggers that are provisioned for the session. Event triggers field 530 may include no value for AF sessions. Specific action field 535 may include a list of specific actions that are provisioned for the session. IP-CAN sessions and GW control session may include no specific actions. Activity timestamp field 540 may include an indication of the time of the last action that PCRN 136 took for the session. Activity timestamp field 540 may use, for example, a network time protocol (NTP) or UNIX time to indicate the time of the last action. For the sake of simplification, timestamp field 540 may be shown using the familiar short time pattern format (HH:mm) in the drawings and examples.

As an example of an entry in data arrangement 500, session 545 may indicate a session with a session ID of "0x284B" for a subscription ID of "100000000000001." Session 545 is an IP-CAN session with one active PCC rule "0xA903" and one active QoS rule "0x12B1." Session 545 lists event triggers 2, 6, and 17 as provisioned to the PGW for the IP-CAN session. The last activity for session 545 occurred at "10:32."

As another example of an entry in data arrangement 500, session 550 may indicate a session with a session ID of "0x72A3" for a subscription ID of "100000000000001." Session 550 is a GW control session with no active PCC rules and one active QoS rule "0x12B1." Session 550 lists event trigger "14" as provisioned to the SGW for the GW control session, which may indicate that no event triggers are provisioned. The last activity for session 550 occurred at "10:36."

As another example of an entry in data arrangement 500, session 555 may indicate a session with a session ID of "0x32C3" for a subscription ID of "100000000000001." Session 555 is an AF session with one active PCC rule "0xA903" and no active QoS rules. Session 545 lists specific action "8" as provisioned to the PGW for the AF session. The last activity for session 545 occurred at "10:40." Session 560 may indicate that data arrangement 500 may include additional entries for additional sessions.

Figure 6:
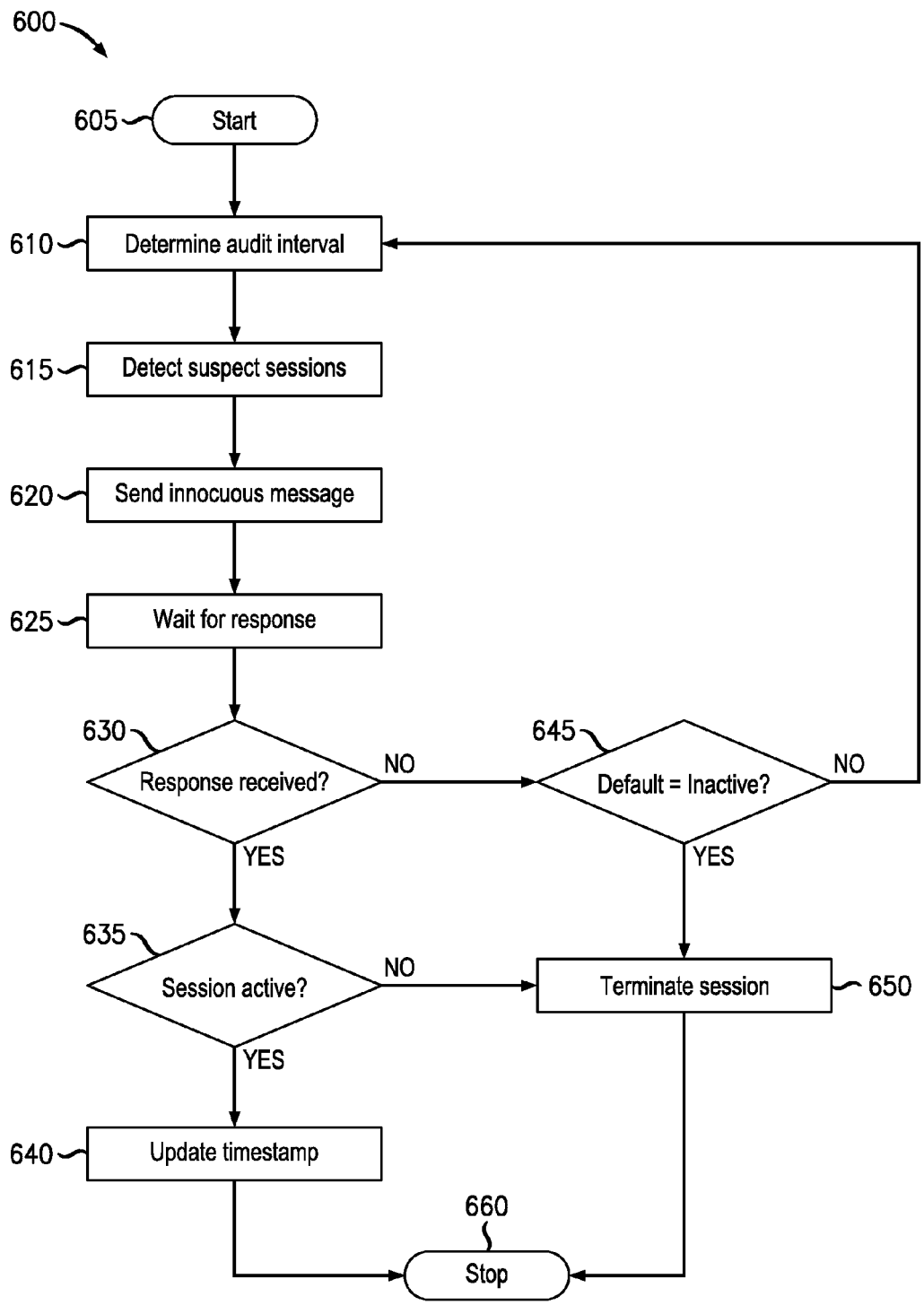
FIG. 6 illustrates an exemplary method for conducting a session audit.

FIG. 6 illustrates an exemplary method 600 for conducting a session audit. Method 600 may begin at step 605 and proceed to step 610. In step 610, timer 330 may wait for a session audit interval to occur. In various exemplary embodiments, an audit interval may be configured for each session or for groups of sessions. Alternatively, timer 330 may be configured with a single audit interval that determines when all sessions are audited. Timer 330 may determine that the audit interval has occurred when the current time is equal to the previous audit time plus the audit interval. The method 600 may then proceed to step 615.

In step 615, timer 330 may detect suspect sessions. For each session in session data storage 325, timer 330 may compare the difference between the current time and the activity timestamp 540 with a suspect inactivity time. A session may be suspect if the difference exceeds the suspect inactivity time. Timer 330 may request session manager 320 to conduct a session audit for any suspect session. The method 600 may then proceed to step 620.

In step 620, session manager 320 may send an innocuous message to the network component that initiated the session. For an IP-CAN session, the network component may be a PGW. For a GW control session, the network component may be a SGW. For an AF session, the network component may be an AN. An innocuous message may be a request message that will not change the state of the session at the network component. As an example, an innocuous message for an IP-CAN session or a GW control session may be a RAR command provisioning event triggers. The provisioned event triggers may match event triggers stored in event triggers field 530, so that the request does not affect any session changes at the SGW or PGW. As another example, an innocuous message for an AF session may be an RAR command including a specific action. Session manager 320 may also include a proprietary AVP in the message to inform the DPA 220 of a default rule for treating a lack of response to the innocuous message.

In step 625, PCRN 136 may wait for a response from the network component. The PCRN 136 may wait for a sufficient time for the network component to respond. The waiting period may be configured, for example, based on an average response time for the network component. In step 630, session manager 320 and/or DPA 220 may determine whether a response to the innocuous message has been received. If a response is received, the method may proceed to step 635. If no response is received, the method may proceed to step 645.

In step 635, session manager 320 may determine whether the session is active based on the response. For example, if the response includes a DIAMETER_SUCCESS (2001) or if an expected error code is returned due to the innocuous message being a repetition of a previously known state which the standards specify is an error, the response may indicate that the session is active at the network component. In this case, the method may proceed to step 640. As a further example, if the response includes a DIAMETER_UNKNOWN_SESSION_ID (5002), the response may indicate that the session is inactive, or has been terminated or orphaned, by the network component. In this case, the method may proceed to step 650.

In step 640, the session manager may update activity timestamp field 540 to include the time of the response. The method may then proceed to step 660, where the method ends.

Returning to step 630, the method may proceed to step 645 if the PCRN 136 does not receive a response. In step 645, the session manager may determine an action based on a default assumption. If the default assumption is that a lack of response indicates inactivity, the method may proceed to step 650. If the default assumption is that lack of response is not treated as inactivity, the method may return to step 610 to wait for another audit interval. In various embodiments, the default assumption may be that a lack of response is not treated as inactivity during the first n−1 audits, but is treated as inactivity the nth time. The value of n may be hard coded, defined by a configurable system variable, or defined for each session in session data storage 325. Session manager 320 may refrain from updating the session timestamp to determine how many audit intervals have occurred.

In step 650, the session manager 320 may take a management action for the inactive session. In various exemplary embodiments, the management action may be to terminate the session. The session manager 320 may treat the unknown session message as if it were a session termination message from the network component. As will be described in further detail with regard to FIGS. 7-9, session manager 320 may then send the appropriate messages to terminate the session at all network nodes. In various alternative embodiments, session manager 320 may manage the session by logging session information and/or sending a simple network management protocol (SNMP) trap message. The method may then proceed to step 660, where the method ends.

Figure 7:
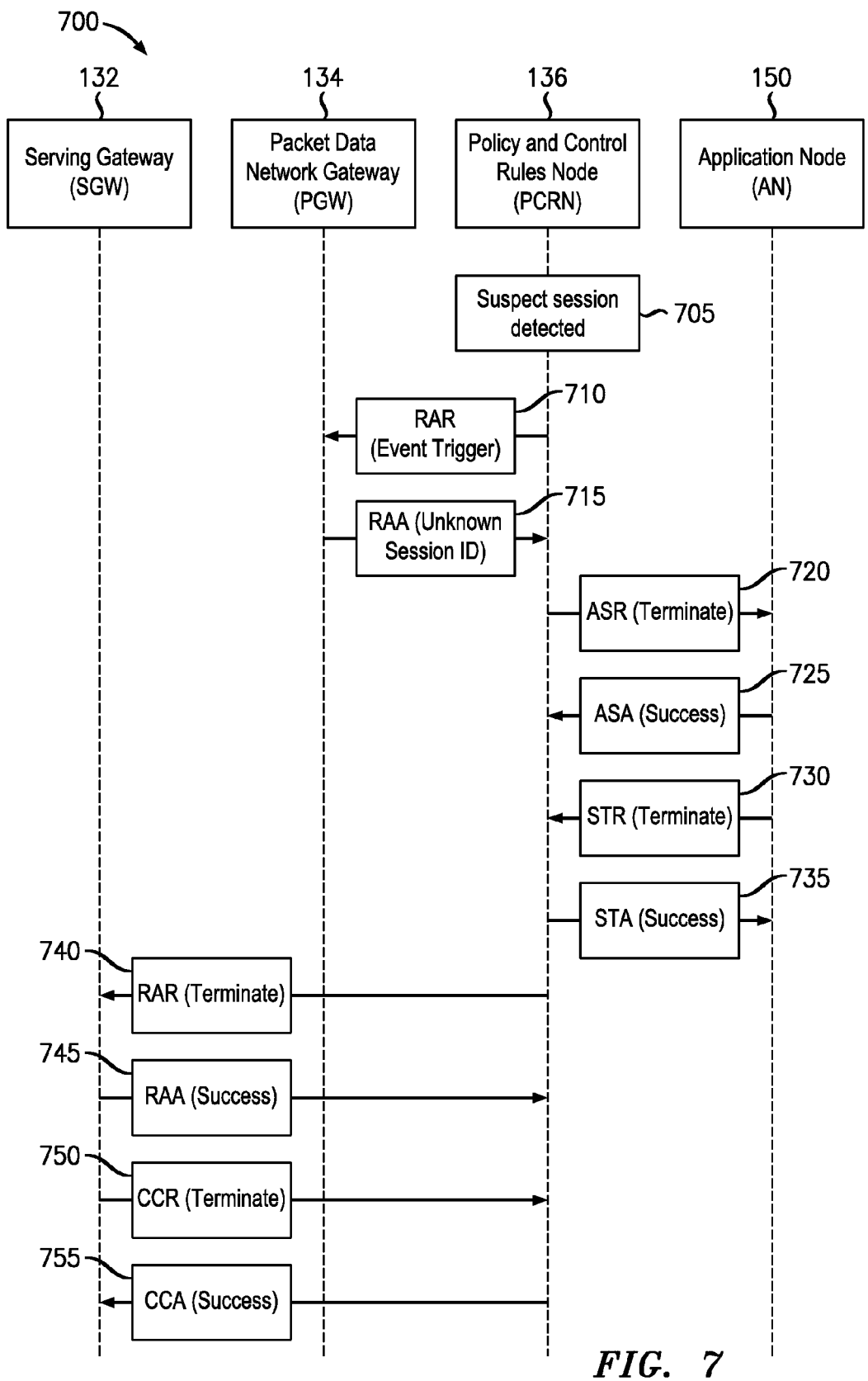
FIG. 7 is an exemplary message diagram illustrating the exchange of messages between entities in the network of FIG. 1 during an IP-CAN session audit.

FIG. 7 is an exemplary message diagram 700 illustrating the exchange of messages between entities in the network of FIG. 1 during an IP-CAN session audit. In step 705, PCRN 136 may determine that an IP-CAN session is suspect of being inactive. Message 710 may be an innocuous message from PCRN 136 to PGW 134 in the form of an RAR command including an event trigger. Message 715 may be a response to message 710. PGW 134 may respond with an RAA command including a result code of either: DIAMETER_UNKNOWN_SESSION_ID (5002) or DIAMETER_SUCCESS (2001) or an expected failure code due to sending a request that doesn't change the state of the device, which may be defined as an error by the 3GPP standards. If the result code is: DIAMETER_SUCCESS (2001) or expected error code, PCRN 136 may stop the session audit because the session is still active. If the result code is DIAMETER_UNKNOWN_SESSION_ID (5002), PCRN 136 may take a management action such as, for example, terminating the IP-CAN session and all related sessions.

Messages 720, 725, 730 and 735 may terminate an AF session associated with the IP-CAN session. Message 720 may be an Abort Session Request (ASR) command from PCRN 136 to AN 150 requesting termination of an AF session associated with the IP-CAN session. Upon receipt of message 720, AN 150 may stop sending data for the session and may update internal records to end the session. Message 725 may be an Abort Session Answer (ASA) command from AN 150 to PCRN 136 acknowledging the request of message 720. PCRN 136 may resend message 720 if it does not receive message 725. Message 730 may be a Session Termination Request (STR) command with a termination request from AN 150 to PCRN 136. Upon receipt of message 730, PCRN 136 may uninstall or delete PCC rules for the session. PCRN 136 may also delete session information related to the session from proxy data storage 230 and session data storage 325. Message 735 may be a Session Termination Answer (STA) command from PCRN 136 to AN 150 acknowledging the request of step 730. AN 150 may resend message 730 if it does not receive message 735. These messages may be sufficient to terminate an AF session at both PCRN 136 and AN 150. An IP-CAN session may be associated with multiple AF sessions, so messages 720, 725, 730, and 735 may be repeated for each AF session associated with the IP-CAN session.

Messages 740, 745, 750, and 755 may terminate a GW control session associated with the IP-CAN session. Message 740 may be a Re-Auth-Request (RAR) command from PCRN 136 to SGW 132 requesting termination of the GW control session. Upon receipt of message 740, SGW 150 may stop sending data for the session and may update internal records to end the session. Message 745 may be a Re-Auth-Answer (RAA) command from SGW 132 to PCRN 136 acknowledging the request of message 740. PCRN 136 may resend message 740 if it does not receive message 745. Message 750, may be a Credit Control Request (CCR) command from SGW 132 to PCRN 136 requesting PCRN 136 to terminate the GW control session. Upon receipt of message 750, PCRN 136 may uninstall or delete PCC rules for the session. PCRN 136 may also delete session information related to the session from proxy data storage 230 and session data storage 325. Message 755 may be a Credit Control Answer (CCA) command from PCRN 136 to SGW 132 acknowledging the request of message 750. SGW 132 may resend message 750 if it does not receive message 755. These steps may be sufficient to terminate a GW control session at both SGW 132 and PCRN 136. In various embodiments, messages 740, 745, 750 and 755 may not be used to terminate a GW control session. PCRN 136 may refrain from sending message 740 to start the termination.

Figure 8:
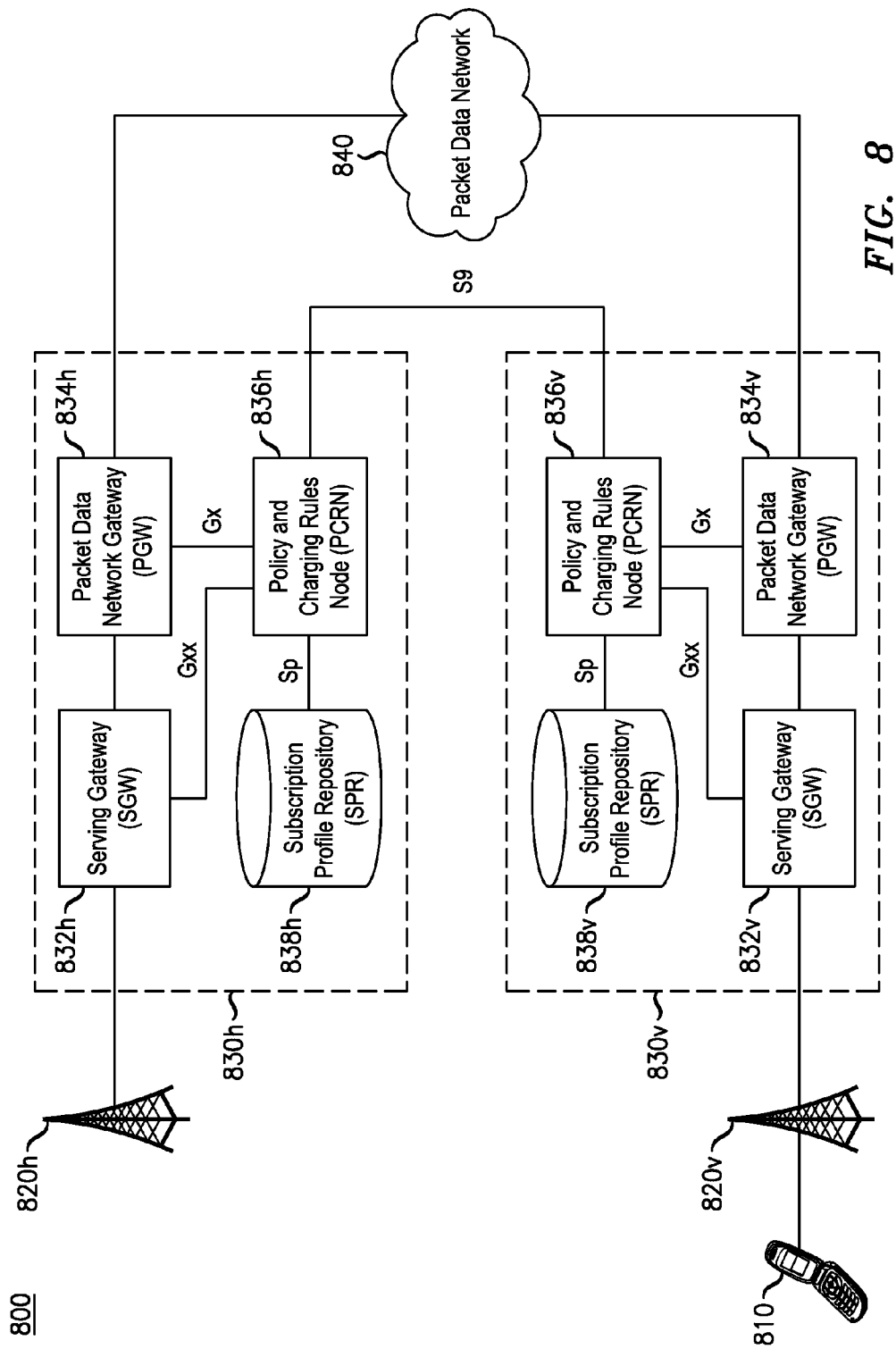
FIG. 8 illustrates an exemplary subscriber network for providing roaming access to various data services.

FIG. 8 illustrates an exemplary subscriber network 800 for providing roaming access to various data services. Exemplary subscriber network 800 may correspond to exemplary network 100. EPC 830v may provide visited access to packet data network 840 for roaming UEs such as UE 810, whereby traffic associated with UE 810 flows through SGW 832v and PGW 834v. Alternatively or additionally, EPC 830v may provide home-routed access to packet data network 840 for roaming UEs such as UE 810, whereby traffic associated with UE 810 flows through SGW 832v and PGW 834h. Accordingly, SGW 832v may be in communication with PGW 834h. Likewise, SGW 832h may be in communication with PGW 834v, such that EPC8230h may provide similar access to other roaming UEs (not shown) attached to base station 820h.

UE 210 may be in communication with a base station 820v but outside the range of base station 820h. Base station 820v, however, may not connect to a home public land mobile network (HPLMN) for the UE 810. Instead, base station 820v may belong to a visited public land mobile network (VPLMN) with respect to the UE 810 and, as such, may not have access to various data associated with the UE 810, a subscriber associated therewith, and/or other data useful or necessary in providing connectivity to UE 810. For example, SPR 838v may not include information associated with UE 810; instead, such information may be stored in SPR 838h. To enable the provision of service based on subscriber information stored in SPR 838h, PCRN 836v may communicate with PCRN 836h via an S9 session.

In various embodiments, PCRN 836v may forward requests associated with UE 810 to PCRN 836h via an S9 session. PCRN 836h may process these messages to, for example, generate PCC and/or QoS rules. PCRN 836h may then forward these rules to PCRN 836v for installation on PGW 834v and/or SGW 832v. In the case of home-routed access, PCRN 836h may also install PCC rules directly on PGW 834h. In view of the cooperative nature of PCRNs 836h, 836v, these devices may be referred to as "partner devices" with respect to each other.

In various embodiments, each partner device may be capable of operating as a home device and a visited device. For example, if another roaming UE (not shown) were attached to base station 820h, PCRN 836h may be additionally capable of forwarding requests to PCRN 836v and PCRN 836v may be capable of returning appropriate rules to PCRN 836h for installation.

Figure 9:
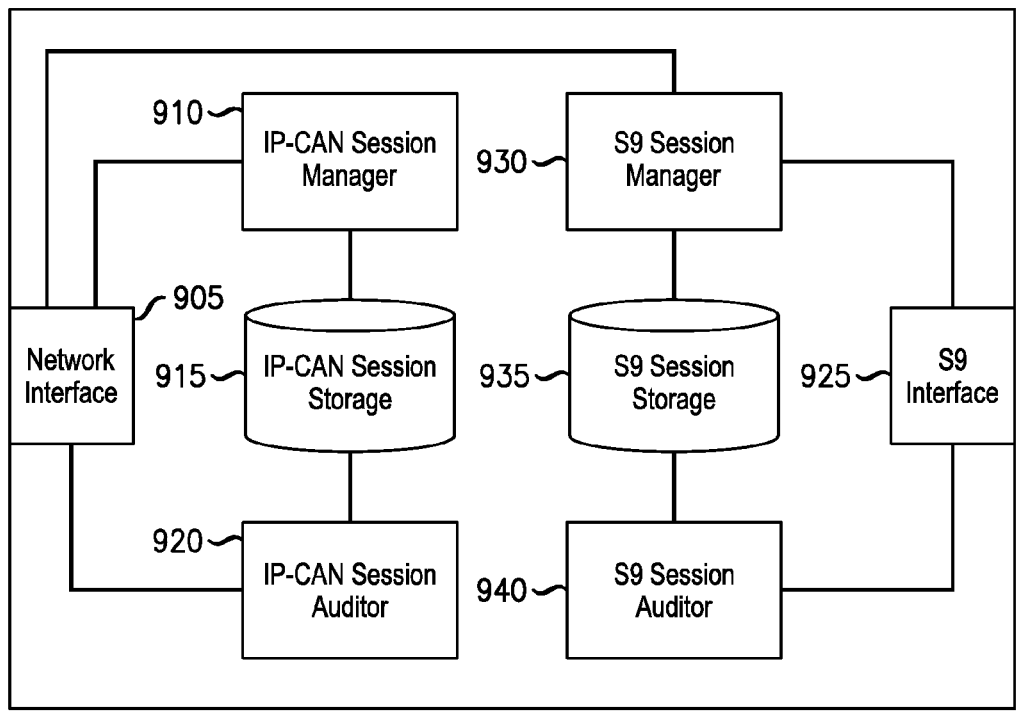
FIG. 9 illustrates an exemplary PCRN for auditing S9 sessions and subsessions.

FIG. 9 illustrates an exemplary PCRN 900 for auditing S9 sessions and subsessions. PCRN 900 may correspond to one or more of PCRNs 136, 200, 836h, 836v. Additionally or alternatively, PCRN 900 may correspond to PCRN blade 300. PCRN 900 may include a network interface 905, IP-CAN session manager 910, IP-CAN session storage 915, IP-CAN session auditor 920, S9 interface 925, S9 session manager 930, S9 session storage 935, and/or S9 session auditor 940.

Network interface 905 may be an interface comprising hardware and/or executable instructions encoded on a machine-readable storage medium configured to communicate with at least one other device such as, for example, a PGW and/or AF. Accordingly, network interface 905 may include a Gx, Gxx, and/or Rx interface. In various embodiments, network interface 905 may be an Ethernet interface.

IP-CAN session manager 910 may include hardware and/or executable instructions on a machine-readable storage medium configured to perform various management functions with respect to IP-CAN sessions. For example, IP-CAN session manager 910 may receive a request for a new IP-CAN session via network interface 905 and subsequently take steps to establish the new IP-CAN session including creating a new IP-CAN session record in IP-CAN session storage 915. IP-CAN session manager 910 may also be adapted to process other requests such as, for example, modification and termination requests associated with an IP-CAN session.

IP-CAN session storage 915 may be any machine-readable medium capable of storing information related to various IP-CAN sessions. Accordingly, IP-CAN session storage 915 may include a machine-readable storage medium such as read-only memory (ROM), random-access memory (RAM), magnetic disk storage media, optical storage media, flash-memory devices, and/or similar storage media. IP-CAN session storage 915 may store a record for each IP-CAN session known to the PCRN 900. Accordingly, IP-CAN session storage may correspond to or otherwise store data similar to that stored by session data storage 325 of FIG. 3. As will be described in greater detail below, IP-CAN session storage may also store records corresponding to "virtual IP-CAN sessions." Such virtual IP-CAN sessions may correspond to S9 subsessions.

IP-CAN session auditor 920 may include hardware and/or executable instructions on a machine-readable storage medium configured to identify IP-CAN sessions stored in IP-CAN session storage 915 that are orphaned and, subsequently, effect the performance of a management action for those orphaned IP-CAN sessions. For example, IP-CAN session auditor 920 may remove those IP-CAN session records from IP-CAN storage 915. Accordingly, IP-CAN session auditor may correspond or otherwise implement similar functions to session manager 320 and/or timer 330 of FIG. 3.

S9 interface 925 may be an interface comprising hardware and/or executable instructions encoded on a machine-readable storage medium configured to communicate with at least one partner device, such as another PCRN (not shown), according to the S9 protocol as described in 3GPP TS 29.215. In various embodiments, S9 interface 925 may be an Ethernet interface. S9 interface 925 may utilize the same hardware as network interface 905.

S9 session manager 930 may include hardware and/or executable instructions on a machine-readable storage medium configured to perform various management functions with respect to S9 sessions. For example, S9 session manager 930 may receive a request for a new S9 session via S9 interface 925 and subsequently take steps to establish the new S9 session including creating a new S9 session record in S9 session storage 935. S9 session manager 930 may also be adapted to process other requests such as, for example, modification and termination requests associated with an S9 session. Further, S9 session manager may further be configured to enable management of S9 subsessions. For example, upon creation of a new S9 subsession, S9 session manager 930 may update an associated S9 session record to identify the new S9 subsession and may create a new virtual IP-CAN session record in IP-CAN session storage 915.

In various embodiments, S9 session manager 930 may further be adapted to translate messages received from the S9 interface 925 into messages formed according to the Gx, Gxx, and/or Rx protocols. S9 session manager 930 may then pass these translated messages to IP-CAN session manager 910. As such, messages received via the S9 interface 925 may be processed using the same modules that process non-roaming request messages received via network interface. In a similar manner, S9 session manager 930 may also be configured to translate response messages generated according to the Gx, Gxx, and/or Rx protocols into messages formed according to the S9 protocol. In this manner, S9 session manager 930 may function as a "bridge" between a partner device and PCRN modules designed for non-roaming functionality.

In various embodiments, each S9 session may be associated with one or more S9 subsessions. An S9 session may be established for each UE of a roaming subscriber while an S9 subsession may be established within the S9 session for each roaming IP-CAN session of that subscriber. As previously noted, upon creation of a new S9 subsession, S9 session manager may create a new virtual IP-CAN session in IP-CAN session storage 915. As such, various functionalities performed with respect to IP-CAN sessions may also be performed with respect to the virtual IP-CAN session and, therefore, the new S9 subsession. For example, IP-CAN session auditor 920 may periodically audit the virtual IP-CAN session in the same manner as described above with respect to FIGS. 1-7, thereby transmitting an innocuous message for the S9 subsession and evaluating the results. As previously described, this innocuous message may include an instruction such as an instruction to provision one or more event triggers that have been previously provisioned for the session.

The virtual IP-CAN session record may differ from other IP-CAN session records in that the virtual IP-CAN session record identifies PCRN 900 itself as the appropriate recipient for outgoing messages related to that session. Therefore, when attempting to send a Gx RAR having an innocuous instruction for the virtual IP-CAN session, IP-CAN session auditor 920 may attempt to send the message via network interface 905 to PCRN 900 itself. Network interface 905 or some other component (not shown) may be configured to recognize this unusual case of PCRN 900 receiving a RAR from itself and to forward such a message to S9 session manager 930. As previously explained, S9 session manager may then be configured to translate and transmit the innocuous instruction over S9 interface 925 to an appropriate partner device. In this manner, S9 subsessions may be audited using the same modules that audit IP-CAN sessions.

S9 session storage 935 may be any machine-readable medium capable of storing information related to various S9 sessions. Accordingly, S9 session storage 935 may include a machine-readable storage medium such as read-only memory (ROM), random-access memory (RAM), magnetic disk storage media, optical storage media, flash-memory devices, and/or similar storage media. S9 session storage 935 may store a record for each S9 session known to the PCRN 900 including identifications of any S9 subsessions associated therewith. Accordingly, S9 session storage 935 may correspond to or otherwise store data similar to that stored by session data storage 325 of FIG. 3. Exemplary contents of PCRN 900 will be described below with respect to FIG. 11.

S9 session auditor 940 may include hardware and/or executable instructions on a machine-readable storage medium configured to audit and clean up orphaned S9 sessions from S9 session storage 935. S9 session auditor 940 may operate in a manner similar to that described above with respect to FIGS. 1-7. For example, S9 session auditor 940 may identify S9 sessions in S9 session storage 935, transmit a message including an innocuous instruction to a partner device via S9 interface 925, evaluate a response to determine whether the S9 sessions have orphaned, and subsequently clean up any orphaned subsessions.

Figure 10:
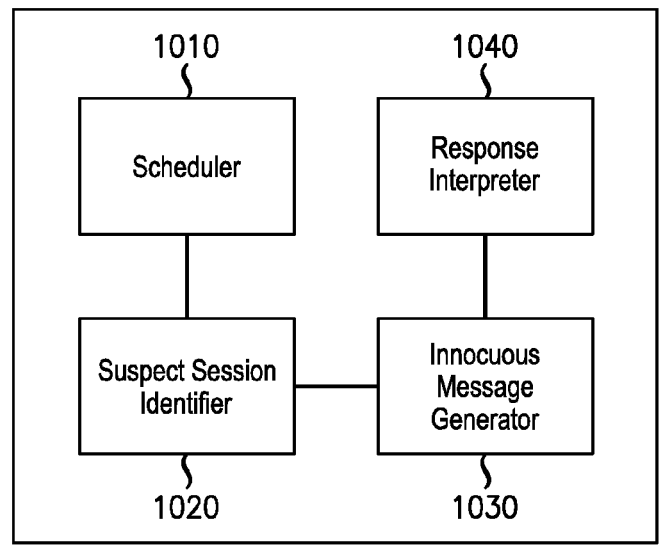
FIG. 10 illustrates an exemplary auditor module.

FIG. 10 illustrates an exemplary auditor module 1000. Auditor module 1000 may correspond to IP-CAN session auditor 920 and/or S9 session auditor 940. For purposes of explanation, auditor module 1000 will be described as corresponding to S9 session auditor 940. The operation of the components of auditor module 1000 when implemented to audit IP-CAN sessions will be apparent in view of the foregoing description. Auditor module 1000 may include a scheduler 1010, suspect session identifier 1020, innocuous message generator 1030, and response interpreter 1040.

Scheduler 1010 may include hardware and/or executable instructions on a machine-readable storage medium configured to periodically indicate to suspect session identifier that S9 sessions should be audited. For example, scheduler 1010 may include a timer and may indicate every minute, hour, or day that S9 sessions should be audited.

Suspect session identifier 1020 may include hardware and/or executable instructions on a machine-readable storage medium configured to, upon receiving an instruction from scheduler to audit S9 sessions, determine whether any known S9 sessions are suspect sessions. For example, suspect session identifier 1020 may iterate through S9 records stored, for example, by S9 session storage 935 and determine whether any such records are likely to correspond to orphaned sessions. In various embodiments, suspect session identifier 1020 may determine an S9 session record is associated with a suspect session when it does not include any identifiers for S9 subsessions. Upon identifying a suspect session, suspect session identifier 102 may forward the corresponding record to innocuous message generator 1030.

Innocuous message generator 1030 may include hardware and/or executable instructions on a machine-readable storage medium configured to generate and transmit test messages to partner devices to determine whether suspect sessions are indeed orphaned. Upon receiving an S9 session record or other indication of a suspect session from suspect session identifier 1020, innocuous message generator 1030 may generate a message including an innocuous instruction for transmission to an appropriate partner device. This innocuous instruction may be chosen to effect no change in the partner device, or any other device, while still eliciting a response sufficient to determine whether the S9 session is still active. For example, the innocuous message may include an instruction to terminate a fake S9 subsession.

As used herein, the term "fake S9 subsession" will be understood to encompass an S9 subsession that is unlikely to have been established. For example, innocuous message generator may select a relatively high number as an S9 subsession identifier and instruct the partner device to terminate a subsession carrying that identifier. In various embodiments wherein a new S9 subsession is assigned the lowest available identifier, it is unlikely that the relatively high S9 subsession identifier has been previously assigned. As such, innocuous message generator 1030 may transmit an instruction to terminate an S9 subsession having an identifier that is unlikely to have been previously assigned, or in other words, a fake S9 subsession. This instruction is innocuous because it may be unlikely to cause any change on the partner device. Instead, because the identified subsession likely does not exist, the partner node is likely to simply respond with an error.

Response interpreter 1040 may include hardware and/or executable instructions on a machine-readable storage medium configured to determine whether an S9 session is orphaned based on a response to the innocuous message received from the partner device. For example, in response to an instruction to terminate a fake S9 subsession, the partner device may respond with an error indicating that the identified subsession is unknown. Response interpreter 1040 may determine, based on this message, that the S9 session identified in the innocuous message was recognized. Accordingly, response interpreter 1040 may determine that the S9 session has not been orphaned and that no further action should be taken.

If, on the other hand, the response includes an error indicating that the S9 session was unknown, response interpreter 1040 may determine that the session is orphaned. Response interpreter 1040 may then remove the S9 session record from an S9 session storage. Response interpreter 1040 may perform other cleanup actions such as, for example, generating a log or a simple network management protocol (SNMP) trap. Such action to be taken may be configurable by a system administration on a system wide or per-session basis.

Figures 11, 12:
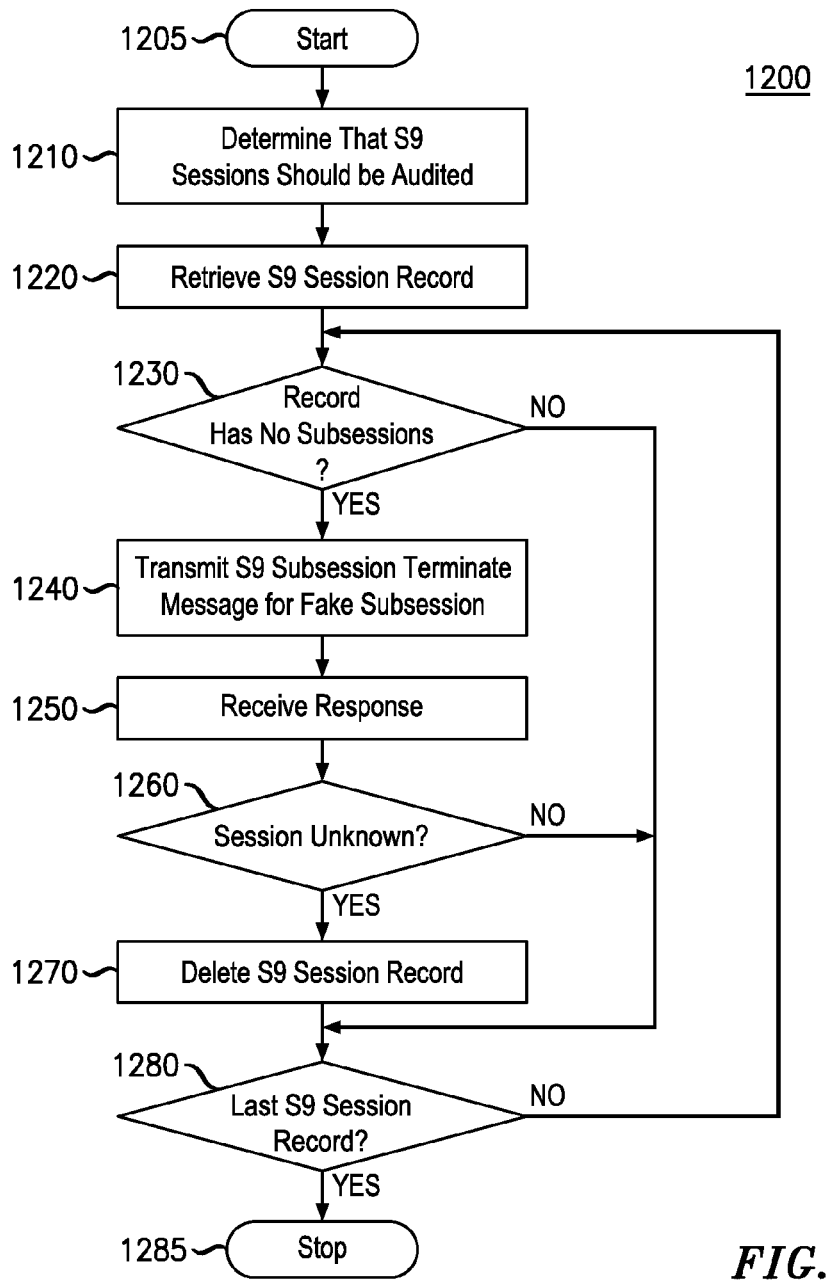
FIG. 11 illustrates an exemplary data arrangement for storing S9 session records.
FIG. 12 illustrates an exemplary method for auditing an S9 session.

FIG. 11 illustrates an exemplary data arrangement 1100 for storing S9 session records. Data arrangement 1100 may be, for example, a group of tables in a database stored in S9 session storage 935 of PCRN 900. Alternatively, data arrangement 1100 could be a series of linked lists, an array, or a similar data structure. Thus, it should be apparent that data arrangement 1100 is an abstraction of the underlying data; any data structure suitable for storage of this data may be used.

Data arrangement 1100 may include a number of fields such as S9 session identifier field 1110, partner device field 1120, and/or S9 subsessions field 1130. Data arrangement 1100 may include numerous additional fields 1140 useful in defining and processing messages associated with an S9 session. S9 session identifier field 1110 may include an identifier for an S9 session associated with the record. Partner device field 1120 may store an IP address or other identifier of a partner device associated with the S9 session. S9 subsessions field 1130 may identify a set of S9 subsessions associated with the S9 session.

As an example, S9 session record 1150 may indicate that an S9 session 0x34 is established with the partner device located at IP address 211.52.2.165 and includes two known S9 subsessions: 0x125F and 0xA3E2. As another example, S9 session record 1160 may indicate that an S9 session 0xA7 is established with the partner device located at IP address 181.164.84.20 but is not associated with any known S9 subsessions. S9 session record 1160 may be an example of a record likely to be deemed suspect because there are no S9 subsessions identified. As such, a PCRN may send an innocuous message to the partner device located at IP address 181.164.84.20 to determine whether record 1160 should be deleted from data arrangement 1100.

FIG. 12 illustrates an exemplary method 1200 for auditing an S9 session. Exemplary method may be performed by the components of PCRN 900 and/or auditor 1000 such as, for example, S9 session auditor 940, scheduler 1010, suspect session identifier 1020, innocuous message generator 1030, and/or response interpreter 1040.

Method 1200 may begin in step 1205 and proceed to step 1210 where the PCRN may determine that one or more S9 sessions should be audited. For example, the PCRN may determine that a predetermined amount of time has elapsed since the previous audit was performed. Next in step 1220, the PCRN may retrieve a first S9 session record to evaluate. In step 1230, the PCRN may determine whether the session corresponding to the record is suspected of being orphaned by, for example, determining whether the record is associated with no S9 subsessions. Additional or alternative methods of identifying suspect S9 sessions will be apparent to those of skill in the art. If the record is associated with one or more subsessions, method 1200 may proceed to step 1280.

If, on the other hand, the PCRN determines that the S9 session is not associated with any known S9 subsessions, method 1200 may proceed from step 1230 to step 1240. The PCRN then, in step 1240, may transmit a message to the appropriate partner device including an innocuous instruction. This instruction may be, for example, an instruction to terminate a fake S9 subsession within the S9 session. This fake subsession may be identified by a high subsession identifier that is unlikely to have been assigned to an actual S9 subsession. After receiving a response to this message in step 1250, the PCRN may evaluate the response in step 1260. If the response does not indicate that the identified S9 session is unknown, the S9 session may remain active and method 1200 may proceed to step 1280. If, however, the response does include an error indicating that the S9 session identified in the innocuous message is unknown, method 1200 may proceed to step 1270. In step 1270, the PCRN may delete the S9 session record because it is associated with an orphaned S9 session. The PCRN may take further management action such as, for example, generating a log or notifying one or more other nodes of the session termination. Method 1200 may then proceed to step 1280 where the PCRN may determine whether additional S9 records remain to be audited. If the just-processed record was not the last such record, method 1200 may loop back to step 1220. Otherwise, method 1200 may proceed to end in step 1285.

According to the foregoing, various embodiments enable a PCRN to clean up orphaned or inactive sessions. For example, by identifying S9 sessions that are unassociated with any subsessions and subsequently sending an instruction to terminate a fake S9 subsession, a PCRN may identify S9 sessions that are orphaned and should be cleaned up. Further, by generating a virtual IP-CAN session associated with each S9 subsession, IP-CAN session auditing procedures may automatically apply to auditing S9 subsessions as well. Various additional benefits of the various embodiments described herein will be apparent to those of skill in the art.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network device for managing a session, the method comprising:
    identifying a session to be tested;
    transmitting a message to another device associated with the session, wherein the message includes an instruction to perform an innocuous action with respect to the session;
    receiving a response from the other device based on transmitting the message; and
    identifying at least one management action to perform with respect to the session based on the response.

2. The method of claim 1, wherein the innocuous action is a deletion of a non-existent subsession of the session.

3. The method of claim 1, wherein
    the response indicates that the session is unknown, and
    the at least one management action comprises deletion of a record associated with the session.

4. The method of claim 1, wherein the session is an S9 session and the other device is at least one of a home policy and charging rules node (PCRN) and a visited PCRN.

5. The method of claim 1, wherein the innocuous action is a provision of a event trigger that has been previously provisioned for the session.

6. The method of claim 1, wherein the at least one management action comprises modification of a record associated with a parent session of the session to remove an identification of the session.

7. The method of claim 1, wherein identifying a session to be tested comprises determining that the session is not associated with any subsessions.

8. The method of claim 1, wherein identifying a session to be tested comprises determining that an IP-CAN session associated with the session has been inactive for a period of time.

9. A network device for managing a session, the device comprising:
    a network interface;
    a memory; and
    a processor in communication with the memory, wherein the processor is configured to:
        identify a session to be tested,
        transmit, via the network interface, a message to another device associated with the session, wherein the message includes an instruction to perform an innocuous action with respect to the session;
        receive a response from the other device based on transmitting the message, and
        identify at least one management action to perform with respect to the session based on the response.

10. The network device of claim 9, wherein the innocuous action is a deletion of a non-existent subsession of the session.

11. The network device of claim 9, wherein
    the response indicates that the session is unknown, and
    the at least one management action comprises deletion of a record associated with the session.

12. The network device of claim 9, wherein the innocuous action is a provision of a event trigger that has been previously provisioned for the session.

13. The network device of claim 9, wherein the at least one management action comprises modification of a record associated with a parent session of the session to remove an identification of the session.

14. The network device of claim 9, wherein in identifying a session to be tested, the processor is configured to determine that the session is not associated with any subsessions.

15. The network device of claim 9, wherein in identifying a session to be tested, the processor is configured to determine that an IP-CAN session associated with the session has been inactive for a period of time.

16. A non-transitory machine-readable medium encoded with instructions for execution by a network device for managing a session, the medium comprising:
    instructions for identifying a session to be tested;
    instructions for transmitting a message to another device associated with the session, wherein the message includes an instruction to perform an innocuous action with respect to the session;
    instructions for receiving a response from the other device based on transmitting the message; and
    instructions for identifying at least one management action to perform with respect to the session based on the response.

17. The non-transitory machine-readable medium of claim 16, wherein the innocuous action is a deletion of a non-existent subsession of the session.

18. The non-transitory machine-readable medium of claim 16, wherein
    the response indicates that the session is unknown, and
    the at least one management action comprises deletion of a record associated with the session.

19. The non-transitory machine-readable medium of claim 16, wherein the innocuous action is a provision of a event trigger that has been previously provisioned for the session.

20. The non-transitory machine-readable medium of claim 16, wherein the at least one management action comprises modification of a record associated with a parent session of the session to remove an identification of the session.

21. The non-transitory machine-readable medium of claim 16, wherein the instructions for identifying a session to be tested comprise instructions for determining that the session is not associated with any subsessions.

22. The non-transitory machine-readable medium of claim 16, wherein the instructions for identifying a session to be tested comprise instructions for determining that an IP-CAN session associated with the session has been inactive for a period of time.

* * * * *